United States Patent
Double

(10) Patent No.: US 7,821,666 B2
(45) Date of Patent: Oct. 26, 2010

(54) ALTERNATIVE TO PRE-PRINTED SPECIAL FORMS

(75) Inventor: Floyd C. Double, Farmdale, OH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1453 days.

(21) Appl. No.: 10/326,220

(22) Filed: Dec. 20, 2002

(65) Prior Publication Data

US 2004/0120011 A1    Jun. 24, 2004

(51) Int. Cl.
*G06K 15/00* (2006.01)
(52) U.S. Cl. .................. 358/1.18; 358/1.15; 358/1.6
(58) Field of Classification Search ............... 358/1.13, 358/1.15, 1.18, 1.11, 1.9, 1.6; 395/117
See application file for complete search history.

(56) References Cited

U.S. PATENT DOCUMENTS

| | | | |
|---|---|---|---|
| 5,563,999 A * | 10/1996 | Yaksich et al. ............. 715/507 |
| 5,878,198 A * | 3/1999 | Yuasa et al. ................ 358/1.18 |
| 6,078,907 A * | 6/2000 | Lamm ........................ 705/40 |
| 6,611,347 B1 * | 8/2003 | Okada et al. ............... 358/1.15 |
| 6,687,016 B2 * | 2/2004 | Gauthier .................... 358/1.11 |
| 2003/0188260 A1 * | 10/2003 | Jensen et al. ................ 715/505 |
| 2003/0210428 A1 * | 11/2003 | Bevlin et al. ............... 358/1.18 |

* cited by examiner

*Primary Examiner*—Edward L Coles
*Assistant Examiner*—Vu B Hang

(57) ABSTRACT

A system and method allowing pre-printed forms to print onto plain paper and also for converting a pre-printed form type system into a plain paper system. The pre-printed form is recreated as an electronic template file in PCL (printer control language) including the contents of the pre-printed form (e.g., the pre-printed text, lines, boxes, logos, etc.), combined with a data file from an application and printed to a plain paper printer. Alternatively, the system may migrate the combined file to a database or web server to allow for easy access and searching by multiple-users at remote locations.

37 Claims, 3 Drawing Sheets

ALTERNATIVE TO PRE-PRINTED SPECIAL FORMS

FIELD OF THE INVENTION

The present invention relates to a system and method for printing on plain paper the output of an application programmed to print onto pre-printed forms and to a method for converting a pre-printed form type system into a plain paper system. By printing to plain paper instead of pre-printed forms, substantial cost savings and efficiency gains can be realized.

BACKGROUND INFORMATION

Methods and systems for using dot-matrix and impact printers to print onto pre-printed forms are well known and have been used in various contexts for years. Typically, a computer application generates data. When a printout of the data is desired, the application generates instructions that tell a printer what to print and how to format the output. Printer Control Language ("PCL") code is one commonly used format for these instructions. Numerous alternatives to PCL, such as Adobe's Postscript format, are also used in the art as application output formats.

In most computer systems the output of the application, for example a string of PCL code, is processed and passed along to a printer. For example, in a UNIX operating system environment, the application may send a LPR (Line Print Request) to the operating system. The PCL code is then typically sent by the operating system to a spooling program and then to the printer backend program. The standard printer backend program, which typically resides as part of the operating system, handles output processing for a given printer by copying the output from a spooling program to the desired printer with whatever setup parameters are specified when the print queue is created through, for example, the SMIT utility. The SMIT utility is the System Management Interface Tool, which is part of IBM's AIX UNIX software.

Alternative printing systems are well known. One such alternative system is Microsoft Windows. For example, printer manufacturers provide printer drivers which are the Windows equivalent of a UNIX printer backend. A driver is selected when a printer is added to the Windows operating system. A printer driver for Windows may be customized in much the same way that a printer backend is customized on a UNIX system.

In a personal computer environment, an impact, dot-matrix, inkjet or laserjet printer receives the printing instructions and prints the desired data onto the pre-printed form. Often pre-printed forms have several layers and carbon sheets are used to print copies of the data onto each of the layers (usually these forms are used in conjunction with an impact or dot-matrix printer). Although the data are identical on each layer, the pre-printed text may vary. For example, an invoice form may contain a shipping copy, a customer copy and a file copy, all with identical data (e.g., inventory) and different pre-printed text.

Often older, "legacy" type applications were written to only print to pre-printed forms. Accordingly, the output code generated by the legacy application is limited to instructions for printing the data. The application does not generate instructions for printing the form (i.e., the pre-printed text, boxes, logos, etc.), because at the time the application was created it was assumed that it would print to pre-printed forms.

Although the use of pre-printed forms is still very common today, particularly in mainframe legacy system environments, the technology is dated and has several drawbacks when compared with current data management systems. One significant drawback with the above-described pre-printed form systems is the substantial cost associated with using pre-printed forms. Pre-printed forms, particularly multi-layer carbon-paper forms, are significantly more expensive than standard plain paper. When a company decides to modify a pre-printed form, perhaps merely to update a phone number on the letterhead, it often must discard large inventories of pre-printed forms. Additionally, dot-matrix and impact printers are significantly more expensive to use and maintain than modern laser and inkjet printers.

In addition, because an impact printer can only have one type of form loaded at any given time, a user must reload the printer each time he wishes to print out a different type of form. In practice, organizations that use pre-printed form systems are often forced to maintain large and expensive print centers. Additionally, there are delays and costs associated with delivering pre-printed form documents from a print center to the user. Legacy applications may also lack the functionality to view and search data without printing out a hard copy. Thus, a user wishing to review data from such a system may be forced to print out very large documents. Legacy data applications may produce hundreds, or even thousands, of pages of data, when the user is only interested in a small subset of that data. In addition to the expense of printing all of the irrelevant data, the user is forced to expend time searching through the printout for the relevant data.

SUMMARY OF THE INVENTION

The present invention provides a method for quickly and inexpensively converting a pre-printed form system into a system that allows a user to direct output to any standard printer connected to the system and to print to plain paper. According to an exemplary embodiment of the present invention, a pre-printed form is recreated in PCL code form ("Form Template PCL"), using a scanner or a software package that supports printing of PCL code to a file instead of printer program, such as Microsoft PowerPoint.

A short custom script file can then be created to merge the Form Template PCL code with the application's data output, which is also in PCL code (the "Data PCL"). The Data PCL contains instructions for printing data on the form, but does not by itself contain any instructions for printing the form itself (i.e., the pre-printed text, boxes, logos, etc.). Merging the Form Template PCL with the Data PCL results in a PCL file that recreates on plain paper the pre-printed form filled out with the data from the application. The printer backend also can be modified to automatically make a call to the custom script file to invoke the merging operation.

Other exemplary embodiments of the present invention include, but are not limited to, a system employing the present invention to print from pre-printed form applications to plain paper and a method for printing the output of a pre-printed form application onto plain paper.

BRIEF DESCRIPTION OF THE DRAWINGS

The accompanying drawings, which are incorporated in and constitute a part of the specification, illustrate several exemplary embodiments of the present invention.

DETAILED DESCRIPTION

The following are examples illustrating the use of exemplary embodiments of the present invention and are not meant to limit the scope of the present invention. The following illustrative examples assume a UNIX based pre-printed form system where an application produces output in the form of PCL code. In the exemplary embodiments, the PCL code can be sent to a printer backend program that passes the PCL code along to a plain paper printer. As will be understood by those of ordinary skill in the art, alternative embodiments of the method of the present invention may be used in non-UNIX systems (e.g., a Windows system), systems where an alternative format to PCL is used (e.g., Adobe's Postscript format), systems where a different printing process is used, or in systems with other variations.

Figure 1:
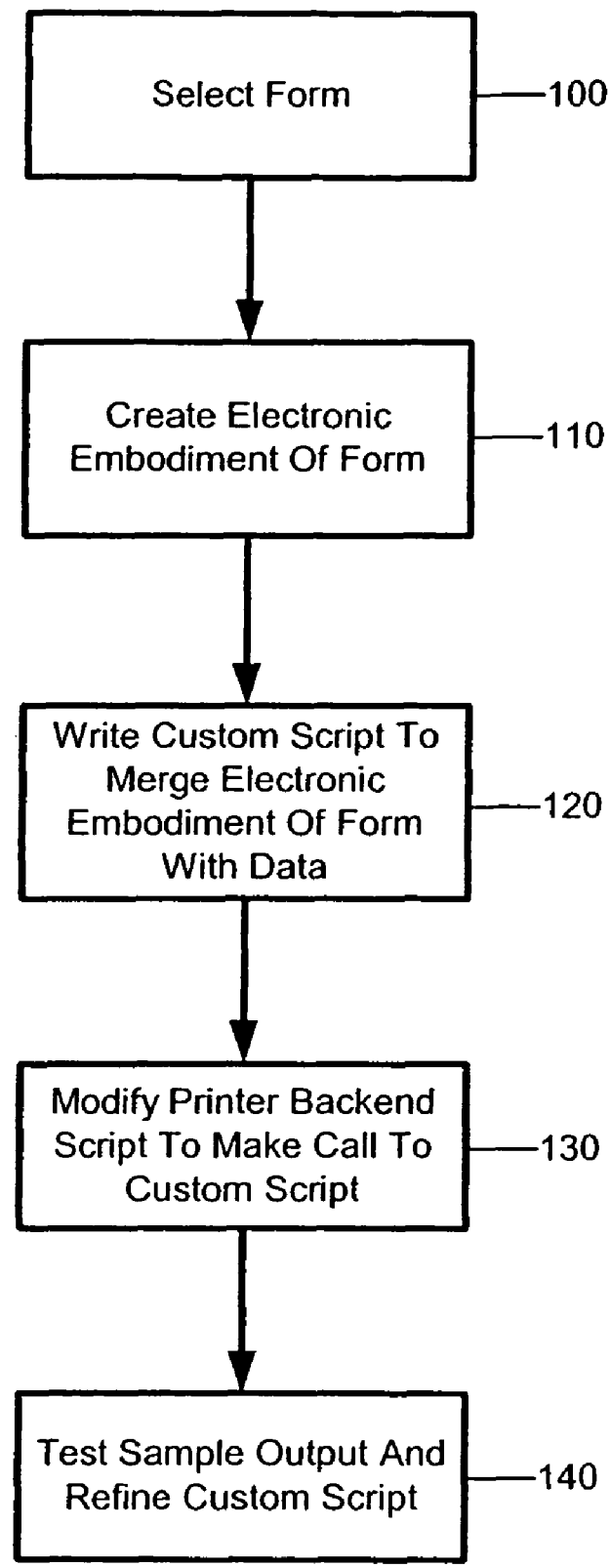
FIG. 1 is a flowchart illustrating a methodology for converting a pre-printed form system to a system capable of printing to a plain paper printer according to an exemplary embodiment of the present invention.

FIG. 1 illustrates a method for converting a system configured to print to pre-printed forms to a system capable of printing to a plain paper printer in accordance with an exemplary embodiment of the present invention. At 100 the user selects a form that is to be adapted for use with the plain-paper printing system. At 110 the user can create an electronic embodiment of a form. The user may create this electronic embodiment by scanning in a hardcopy printout of the form, recreating the form on a computer using a graphics or design program such as Microsoft's PowerPoint, or using other methods known to those of ordinary skill in the art.

The user may then create a string of PCL code containing the instructions to print a blank version of the pre-printed form ("Form Template PCL"). For example, if the user is using Microsoft's PowerPoint, after graphically recreating the form, the print to file option can be selected. PowerPoint then generates a PCL file that can be used as a Form Template PCL for the form. A variety of alternative programs and techniques are known in the art for creating equivalent files, and a variety of alternative formats, such as Adobe's Postscript, may be used. PCL has been found to be an especially advantageous format as it is readily merged and manipulated with simple scripts, and allows for the precise specification of elements (e.g., text, boxes or logos) on a page.

At 120 the user can write a custom script. The custom script contains, for example, instructions to combine the Data PCL generated by the application with the Form Template PCL to create a merged PCL file containing instructions for printing both the form and the data that will fill out the form. A variety of techniques may be used to achieve this result. For example, the script may remove the end-of-file command from the end of the Form Template PCL, append the Data PCL, add instructions for the placement of the data from the Data PCL file, and finally add an end-of-file command to the end of the merged PCL file.

An exemplary sample custom script is provided below to perform the function of merging a Form Template PCL with a Data PCL in a UNIX environment. The custom script is written in AWK, but it should be noted that the sample custom script is for illustrative purposes only, and should not be taken as limiting the range of techniques and alternative languages available to the person of ordinary skill in the art. For example, the script can define static variables for use throughout the script, strip away any superfluous pages, specify the font size and starting location, look for page-break or form-feed signals and create corresponding new pages, pass the generated PCL file to the print queue, initiate a call to a program to convert a copy of the PCL file into a .pdf file, append indexing information to the .pdf file, initiate a call to FTP to migrate the .pdf file to a web server and finally verify that the file transfer was successfully completed.

```
BEGIN { { "echo $$ " | getline procno } { close("echo $$ ") }
        { recs=0 } { page=1 } { cat = "/usr/bin/cat " } { scrap=0 } {scrapped=0}
        { prog_dir = "/usr/oc/eps/curts.files/form-olst" }
        { "date +'%y%m%d'" | getline datestring } { close("date +'%y%m%d'") }
        { "date +'%H%M%S'" | getline timestring } { close("date +'%H%M%S'") }
        { gfv = substr(datestring,3,2)"/"substr(datestring,5,2)"/"substr(datestring,1,2) }
        { pcl2pdfcmd = "/usr/oc/eps/curts.files/PCL2PDF/AIXPCL2PDF501-43" }
        { pcl2pdfparms = "-DIA:\"Company One \" -DIC:\"Company Two \"" }
        { zipcmd = "/usr/oc/eps/curts.files/zip-utility/zip -jv" }
        { ftpuser = "XXXXXX" } { ftppass = "XXXXXXX" }
        { ftphost = "XXXXXXXXXXXXXXXX" }
        { ftpdest = "/Companytwo /dpak_data/dpftp/" }
        { stdform = prog_dir"/form-olst.pcl" }
        { pdfform = prog_dir"/form-olst-pdf.pcl" }
        { tmparea = "/0c/data/form-olst" }
        { tmpfile = tmparea"/"jobname".FORM-OLST."procno }
        { pclfname = tmparea"/form-olst."procno".pcl" }
        { pcl4pdfname = tmparea"/form-olst-4pdf."procno".pcl" }
        { rootfname = "COMPANY.TWO.RPT.OLIMPIC-OLST."datestring"."timestring }
        { pdffname = "/0c/data/pdfs/"rootfname".ard.out" }
        { indxfn = "/0c/data/pdfs/"rootfname".ard.ind" }
        { stubfn = "/0c/data/pdfs/"rootfname".stub" }
        { rstubfn = ftpdest""rootfname".stub" }
        { zipfn = "/0c/data/pdfs/"rootfname".zip" }
        { rzipfn = ftpdest""rootfname".zip" }
        { system(cat""prog_dir"/form-olst-legend.pcl > "pclfname) }
    }
```

```
        { gsub("\015","",$0) }
        { ++recs }
        { if ( match( $0 , "XXXXXXXXXXXXXXXXXXXXXXXXXXXXX" ) )
                { if (recs < 10 )
                        { scrap++ }
                }
        }
        { if (recs==1)
                { printf"\033&l1O\033&l0e0l0M\033(10U\033(s0p10.4h0s0b4102T\033*p0x160Y\033&l7.4C" >
tmpfile"."page }
        }
        { if (match($0,"
                                    ") != 0 )
            { { clfname = tmpfile"."page }
                { if (recs < 5)
                    {    { close(clfname) }
                         { system("/usr/bin/rm "clfname) } { close("/usr/bin/rm "clfname) }
                         { recs = 0 }
                    }
                    else
                    {    if ( scrap < 2 )
                         { { printf"\033E\033%%-12345X" >> clfname } { close(clfname) }
                              { system(cat" "stdform" "clfname" >> "pclfname) }
                              { system(cat" "pdfform" "clfname" >> "pcl4pdfname) }
                              { system("/usr/bin/rm "clfname) } { close("/usr/bin/rm "clfname) }
                              { ++page } { recs = 0 }
                         }
                         else
                         { { system("/usr/bin/rm "clfname) } { close("/usr/bin/rm "clfname) }
                              { recs = 0 }
                              { scrap = 0 }
                              { ++page } { ++scrapped }
                         }
                    }
                }
            }
            else
            { { printf"\r\n%s",$0 >> tmpfile"."page }
                { ++recs }
            }
        }
END     { { page=page-scrapped }
            { system("mv "pclfname" /0c/data/purchasing_output/"jobname".FORM-
OLST."procno"."page".pcl") }
            { system(pcl2pdfcmd" "pcl4pdfname" "pdffname" pcl2pdfparms) }
            { system("/usr/bin/rm "pcl4pdfname) }
            { printf"COMMENT: Purchase Authorization - Stores\nCODEPAGE:850\n" > indxfn }
            { printf"GROUP_FIELD_NAME:rpt_date\nGROUP_FIELD_VALUE:%s\n",gfv >> indxfn }
            { printf"GROUP_FIELD_NAME:jobname\nGROUP_FIELD_VALUE:%s\n",jobname >> indxfn }
            { printf"GROUP_OFFSET:0\nGROUP_LENGTH:0\nGROUP_FILENAME:%s.ard.out\n",rootname >>
indxfn }
            { "ls -l "pdffname | getline flist } { close("ls -l "pdffname) }
            { close(pdfpclfname) } { system("/usr/bin/rm "pdfpclfname) }
            { split(flist,pdf_filesize) }
            { printf"1\n%s.ard.out:%s:%s\n",rootname,pdf_filesize[5],page > stubfn }
            { close(stubfn" "indxfn) }
            { system(zipcmd" "zipfn" "pdffname" "indxfn) }
            { "ls -l "zipfn | getline zip } { close("ls -l "zipfn) }
            { split(zip,zip_filesize) }
            { ftpinput = tmparea"/ftp-input" } { ftpoutput = tmparea"/ftp-output" }
            { printf"open %s\nuser %s %s\n",ftphost,ftpuser,ftppass > ftpinput }
            { printf"cd %s\nbin\nput %s %s\n",ftpdest,zipfn,rzipfn >> ftpinput }
            { printf"put %s %s\nnlist %s\n",stubfn,rstubfn,rzipfn >> ftpinput }
            { printf"nlist % s\nquit\n",rstubfn >> ftpinput } { close(ftpinput) }
            { FTPCMD = "/usr/bin/ftp -in < "ftpinput" > "ftpoutput }
            { system(FTPCMD) } { close(FTPCMD) } { close(ftpoutput) }
            { "/usr/bin/grep "rzipfn" "ftpoutput | getline interest }
            { close("/usr/bin/grep "ftpdest" "zipfn" "ftpoutput) }
            { system(cat""ftpoutput) } { close(cat""ftpoutput) }
            { printf"\nremote zipfilesize = %s\n",interest }
            { printf"local zipfilesize = %s\n",zip }
            { split(interest,intsize) }
            { if (intsize[5] == zip_filesize[5])
                { { system("/usr/bin/rm "indxfn" "pdffname" "stubfn" "zipfn) }
                    { close("/usr/bin/rm "indxfn" "pdffname" "stubfn" "zipfn) }
                }
            }
```

```
    { system ("/usr/bin/rm "ftpinput" "ftpoutput) }
    { close ("/usr/bin/rm "ftpinput" "ftpoutput) }
    { close (tmpfile"."page) }
    { system ("rm "tmpfile".*") }
}
```

For multi-layer documents, the custom script may be configured to create multiple versions of the document within the single merged PCL file. For example, to replicate an invoice form containing a shipping copy, a customer copy and a file copy, the custom script would create a merged PCL file including a page consisting of the data merged with the shipping form, as well as separate pages for the data merged with the customer form and the file copy form.

At 130 the user may modify the printer backend by inserting an instruction to make a call to the custom script. A standard line editor may be used to add the call to a custom script to the printer backend as described in more detail below.

Alternatively, or in addition to inserting an instruction to make a call to the custom script, the user may insert an instruction to make a call to a conversion program. The conversion utility may convert the PCL code into another format (e.g., Adobe's .pdf, .tif or other formats known in the art). The user may insert an additional instruction to migrate the converted code onto a web server, database or other storage location ("Web Server") for indexing, archiving and/or retrieval at a later time. Alternatively, the printer backend script may migrate the merged PCL file directly to a Web Server without conversion. The migration function may be performed using an FTP (File Transfer Protocol) instruction or other file transfer methods known in the art.

At 140 the user may test the system and refine the custom script. For example, the user may confirm that the data lines up properly with the form template, and if does not, may modify the custom script or the form template to correct the misalignment. This may be easily done with a graphics editing program such as Microsoft PowerPoint, which allows the user to make fine adjustments to lines, boxes, static text and logos to fit the text layout precisely.

The creation of the custom script and modification to the printer backend script are readily understood by those of ordinary skill in the art. For example, most modifications are straightforward and often require less than 100 lines of software code to implement (see, e.g., the sample custom script previously provided). The process is repeated for each form that is to be used in the system.

In an exemplary embodiment, the modified system takes the output from the legacy application that is programmed to print to pre-printed forms, and then merges the output with the Form Template PCL. Accordingly, there is no need to modify the existing legacy application because the modified system still uses the application's original output format (i.e., data without the pre-printed text of the form, boxes, logos, etc.). Limiting the modifications to the printer backend and the use of a custom script is extremely advantageous because relative to modifying the printer backend and writing a script, it is typically an extremely expensive, labor-intensive, time-consuming and error-prone task to modify an application.

Figure 2:
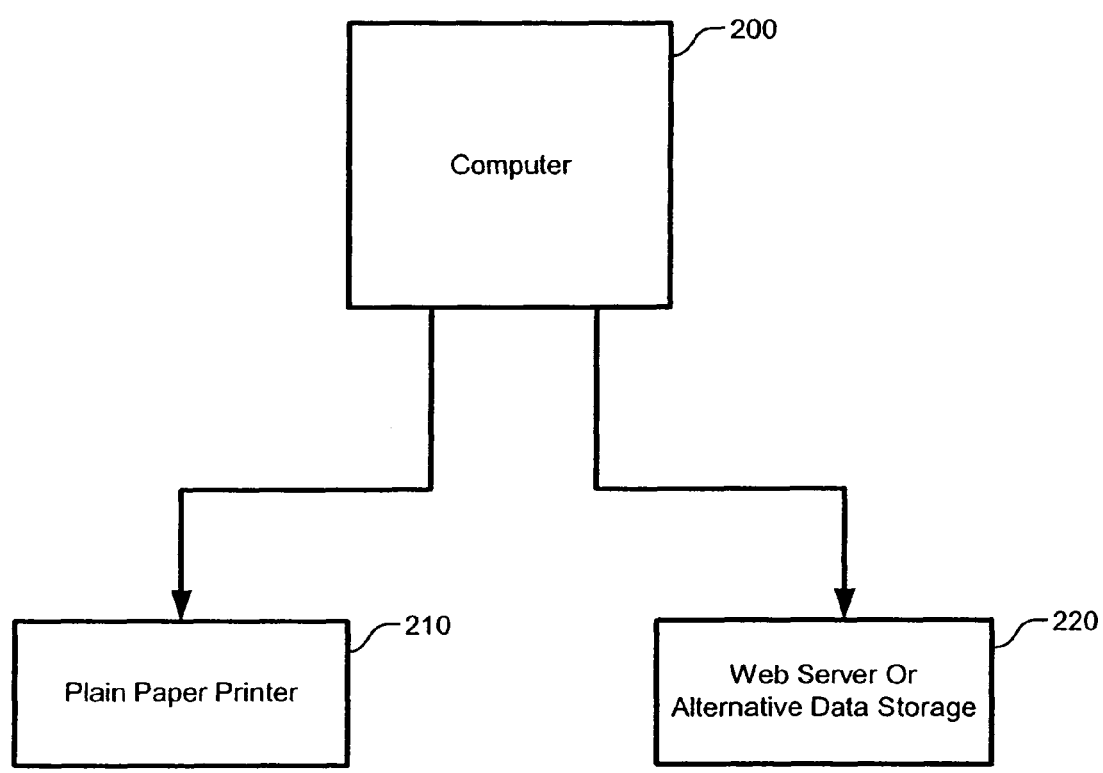
FIG. 2 is a block diagram of a system for printing documents from a pre-printed form application using a plain paper printer according to an exemplary embodiment of the present invention.

FIG. 2 illustrates a system for printing documents from a pre-printed form application onto plain paper according to an exemplary embodiment of the present invention. The system includes, for example, a computer 200, a plain paper printer 210 and a Web Server 220. The computer 200 runs an operating system and stores information in its memory. This information may include an application, a printer backend program, a custom script, and a Form Template PCL. The application, which was programmed to print onto a pre-printed form, is typically an older legacy application, although the system of the present invention may be used with newer applications that have been programmed to print to pre-printed forms. The application generates output for printing. In one embodiment of the present invention, the data output is also stored in the computer's memory and is in PCL code. The Data PCL code is sent by the operating system to a printer backend program.

The printer backend program may be programmed to make a call to a custom script. Typically the printer backend program is the operating system's original printer backend program with the addition of instructions to call the custom script. The custom script, when called by the printer backend program, modifies the Data PCL by merging it with a Form Template PCL to create a merged PCL code. In one embodiment of the present invention, the Form Template PCL is stored in the memory of the computer 200. When the custom script terminates, the operating system returns the merged PCL code to the printer backend program.

In systems where the application(s) is programmed to print to multiple pre-printed forms, the computer can store multiple custom scripts, each of which can be programmed to merge a particular kind of Data PCL with the appropriate Form Template PCL. For example, the printer backend program may parse the top portion of the Data PCL to identify the appropriate type of pre-printed form, and then may make a call to the appropriate custom script. To accomplish this result, the system may be configured to attach a header page with various information fields including an identifying form code, or the printer backend program may be configured to identify the document based on its contents. Alternatively, the custom script itself may identify the appropriate Form Template PCL. In other embodiments of the present invention, it may be pre-determined that all text received by a specific printer backend will use a specific Form Template PCL. For example, in a system with three types of forms and three printers, each printer may be designated to print a single form. Thus when a user requests that an application print to a specific printer, the Data PCL generated by the application is sent by the operating system to the printer's specific printer backend program, which will then make a call to the appropriate custom script.

The printer backend program may be programmed to then send the merged PCL code to plain paper printer 210, which then prints the document on plain paper. Because the merged PCL code contains instructions for both the data and the form template, the output will result in the data placed on the desired form.

In addition or as an alternative to sending the merged PCL code to plain paper printer 210, the printer backend program may send the merged code directly to a Web Server 220, or may send the merged PCL code to a conversion program so that, for example, the resultant form is readily accessible over the internet or for searching purposes. The optional conversion program converts the merged PCL code into a format that is more readily used by the Web Server 220. Numerous conversion programs are known to those of ordinary skill in the art, such as Visual Software Inc.'s PCL2PDF. Additionally, numerous conversion formats, such as Adobe's Postscript format, HTML (Hyper-Text Markup Language) and XML (eXtended Markup Language) are known in the art.

The custom script that called the conversion may then take the output from the conversion program and send it the Web Server 220 host via the FTP (File Transfer Protocol) service or another file transfer method. Alternatively, the conversion program may return the converted file to the printer backend program, which will then send the converted file to the Web Server 220.

At this point, a user may access the Web Server 220 to view the converted file. The Web Server 220 may be configured to allow the user to perform searches and other data processing functions on the files or to print to a plain paper printer 210. Using this system, the need for impact printers and pre-printed forms can be eliminated.

Figure 3:
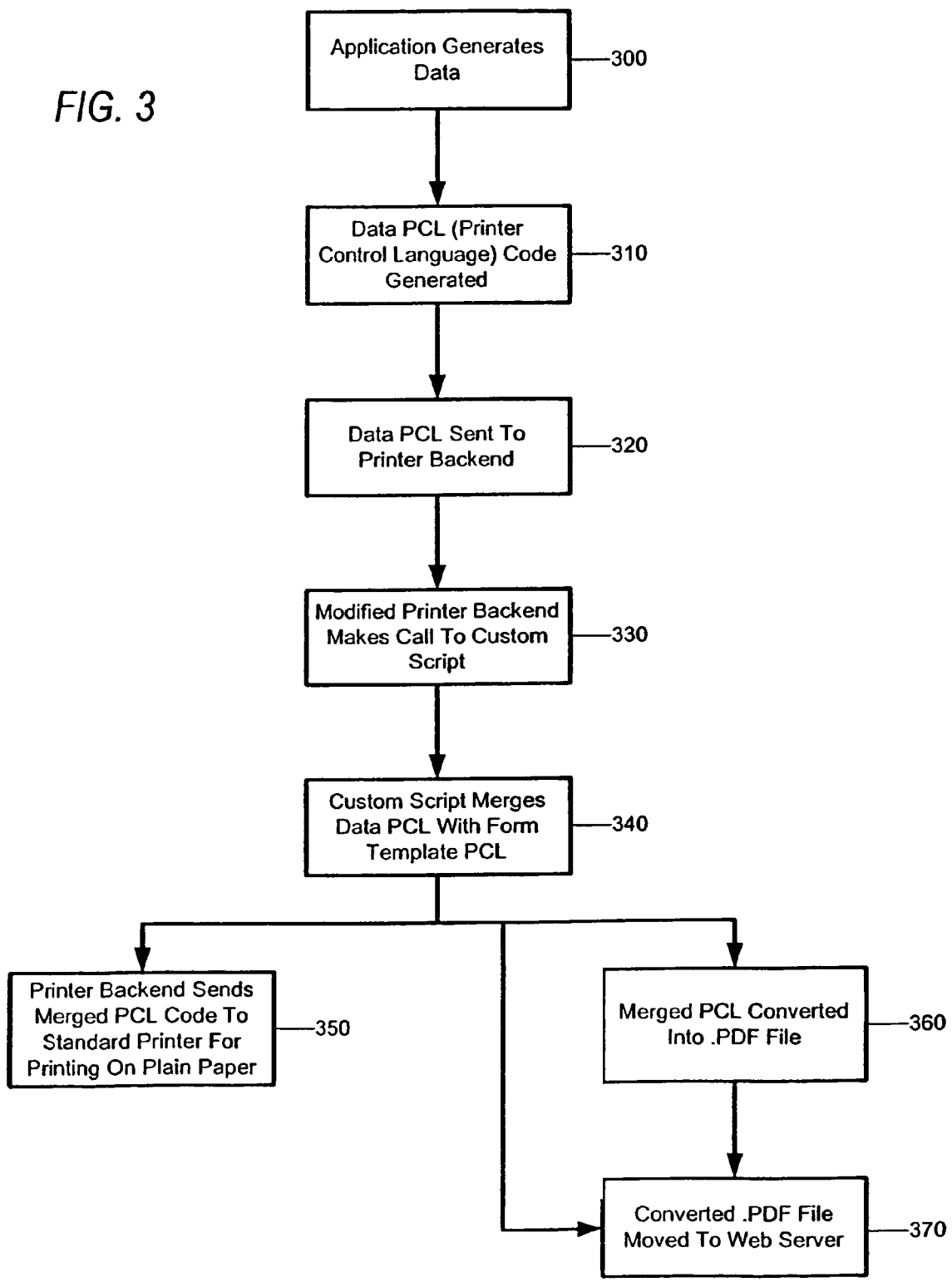
FIG. 3 is a flowchart illustrating the methodology of a system for printing documents from a pre-printed form application using a plain paper printer according to an exemplary embodiment of the present invention.

FIG. 3 illustrates a method for printing documents from an application programmed to print to pre-printed forms using a plain paper printer according to an exemplary embodiment of the present invention.

At 300 the application generates data. For example, the user may input the name of a customer and the customer's order, and then instruct the application to produce shipping documents. At 310 the application generates a Data PCL containing instructions to print the requested data on a pre-printed form. Because the application has been programmed to print to pre-printed forms, the Data PCL that it generates does not contain any information for printing the form (i.e., the pre-printed text, boxes, logos, etc.), only the data that will be printed onto the form. At 320 the Data PCL is sent to the modified printer backend program by the operating system. In a UNIX environment the application may send a LPR (Line Print Request) to the operating system. The LPR request specifies which queue on the LPD (Line Printer Daemon) host to use, therefore specifying a specific printer backend. This operation may be defined statically (e.g., all print operations from a particular application will be sent to a specific printer backend), as is the case in batch execution, or by a user profile/selection (e.g., the user's profile, which may be modified by the user, specifies which printer backend will be used) when invoked interactively.

At 330 the modified printer backend program makes a call to the custom script. As previously described, the printer backend program may examine the header page or top portion of the Data PCL to identify the appropriate type of pre-printed form, and then may make a call to the appropriate custom script. Alternatively, the custom script itself may identify the appropriate Form Template PCL. In other exemplary embodiments of the present invention, it may be pre-determined that all text received by a specific printer backend will use a specific Form Template PCL. At 340 the custom script merges the Data PCL with a stored Form Template PCL to create a merged PCL.

At 350 the modified backend program may send the merged PCL to a plain paper printer for printing. Alternatively, or in addition to printing to a plain paper printer, at 360 the modified printer backend may send the merged PCL to a conversion program. The conversion program then converts the merged PCL into an alternative format such as Adobe's .pdf format. At 370 the converted file can be migrated to a Web Server. Alternatively, the printer backend program may send the PCL code directly to the Web Server without first sending it to a conversion program. For example, desktop software tools are commercially available which allow a user to view PCL images without converting them, such as Swift-View, Inc.'s SwiftView.

Embodiments of the present invention provide numerous advantages over prior art printing systems and methods. As discussed previously, pre-printed form printing systems are expensive to maintain and create additional delays and infrastructure demands. Embodiments of the present invention that print to plain paper printers significantly reduce the printing cost and eliminate the need to maintain expensive impact printers and print centers. Additionally, embodiments of the present invention significantly increase the flexibility of print systems, because a single printer may be readily used to print any document. In prior art systems this flexibility does not exist because an impact printer is typically only capable of having one type of pre-printed form loaded at any given time.

Using the method of the present invention to convert a pre-printed form system into a plain paper system also provides numerous advantages over prior art conversion methods. Prior art methods involve modifying the legacy application to convert it to generate output that includes both data information and form template information and is thus capable of printing to plain paper or replacing the legacy application with a new application already configured to print to plain paper. Both approaches are extremely time consuming, labor intensive, expensive and error prone. Replacing the application may involve the additional expense and trouble of retraining employees and converting current data stores. Often, when an enterprise is using an older legacy application, it may be expensive, difficult and/or impossible to locate programmers capable of modifying the original application. Because there is no need to replace or modify the application, the conversion method of the present invention involves far less programming that is significantly less expensive, time consuming and prone to error than prior art methods.

Exemplary embodiments of the present invention that are configured to store a copy of the document on a Web Server also provide additional advantages over prior art systems. Users may now access the Web Server to view or search the documents. This allows users to quickly locate documents and data within documents as compared to manually searching physical documents. Further, multiple users may access the documents from multiple locations providing additional utility without the need to maintain multiple hardcopy printouts of the documents. Users may choose to use the Web Server to grant convenient access to select documents to customers, which would be impossible in a pre-printed form system. A user wishing to review data from a pre-printed form legacy system may be forced to print out very large files. Legacy data applications may produce hundreds or even thousands of pages of data, when the user is only interested in a small subset of that data. In addition to the expense of printing all of the irrelevant data, the user is forced to expend time searching through the printout for the relevant data. The expense and delay is eliminated in the embodiments of the present invention that store documents on a Web Server.

Thus, while there had been described what are presently believed to be the preferred embodiments of the present invention, those skilled in the art will appreciate that other and further modifications can be made without departing from the true scope of the invention, and it is intended to include all such modifications and changes as come within the scope of the claims as appended herein.

What is claimed is:

1. A method of printing a pre-printed form on a plain paper printer, comprising:
    obtaining, by a computer, a data code file generated by a legacy application, said data code file representing an output of the legacy application in text and blank spaces, wherein the legacy application generates the data code file configured for printing directly onto a preprinted paper form, the data code file comprising a predefined format associated with the legacy application;
    identifying, by the computer, a selected one of a plurality of form code files associated with the data code file based on the output of the legacy application represented in the data code file, each one of the plurality of form code files specifying a corresponding one of plural types of forms, each of the plural types of forms comprising at least one of preprinted text, lines, boxes and logos;
    merging, by the computer, the data code file generated by the legacy application with the identified form code file to form a merged file, and
    sending the merged file for printing using a plain paper printer,
    wherein each of said data code file and said identified form code file comprise instructions in a page description language and wherein said merging is implemented by a printer backend program in the computer to create the merged file.

2. The method of claim 1, wherein the data code file includes an indicator associated with one of a predetermined set of the plurality of form code files.

3. The method of claim 1, wherein the data code file includes PCL code containing instructions for printing the data on a pre-printed form.

4. The method of claim 1, further comprising:
    transferring the merged file to at least one of another computer, a web server and a database.

5. The method of claim 1, further comprising:
    converting the merged file to a predetermined format.

6. The method of claim 5, wherein the predetermined format is one of PCL, .tif, .pdf and Postscript.

7. A method of converting a pre-printed form system into a system capable of printing a pre-printed form on a plain paper printer, comprising:
    creating a plurality of form code files, each one of the plurality of form code files specifying a corresponding one of plural types of forms, each of the types of forms comprising at least one of preprinted text, lines, boxes and logos; and
    creating a script executable on a computer to:
        obtain a data code file generated by a legacy application, said data code file representing an output of the legacy application in text and blank spaces, wherein the legacy application is adapted to generate the data code file configured for printing directly onto a pre-printed paper form, the data code file comprising a predefined format associated with the legacy application; and
        identify a selected one of a plurality of form code files associated with the data code file based on the output of the legacy application represented in the data code file;
        merge the data code file generated by the legacy application with the identified form code file,
    wherein each of said data code file and said form code file comprise instructions in a page description language, and wherein said merging is implemented by a printer backend program executable in the computer to create a merged file.

8. The method of claim 7, wherein the script is executable to transfer the merged file to at least one of another computer, a web server and a database.

9. The method of claim 7, wherein the data code file includes PCL code containing instructions for printing the data on a pre-printed form.

10. The method of claim 7, wherein the script is executable to convert the merged file to a predetermined format.

11. The method of claim 10, wherein the predetermined format is one of PCL, .tif, .pdf and Postscript.

12. A system for printing on a plain paper printer an output of a legacy application programmed to print onto a pre-printed form, comprising:
    a computing system comprising a processor and a memory;
    a plain paper printer coupled to the computing system;
    wherein the memory contains machine programmable code to be executed by the central processing unit, the machine programmable code including instructions to:
        obtain a data code file generated by the legacy application, said data code file representing the output of the legacy application in text and blank spaces, wherein the legacy application is adapted to generate the data code file configured for printing directly onto a pre-printed paper form, the data code file comprising a predefined format associated with the legacy application;
        identify a selected one of a plurality of form code files associated with the data code file based on the output of the legacy application represented in the data code file, each one of the plurality of form code files specifying a corresponding one of plural types of forms, each of the plural types of forms comprising at least one of preprinted text, lines, boxes and logos;
        merge the data code file generated by the legacy application with the identified form code file to form a merged file; and
        send the merged file for printing using a plain paper printer;
    wherein each of said data code file and said identified form code file comprise instructions in a page description language, and wherein said merging is implemented by an printer backend program in the computing system to create the merged file.

13. The system of claim 12, wherein the data code file includes an indicator associated with one of a predetermined set of the plurality of form code files.

14. The system of claim 12, wherein the data code file includes PCL code containing instructions for printing the data on a pre-printed form.

15. The system of claim 12, wherein the machine programmable code further comprises instructions to:
    transfer the merged file to at least one of another computer, a web server and a database.

16. The system of claim 12, wherein the machine programmable code further comprises instructions to:
    convert the merged file to a predetermined format.

17. The system of claim 16, wherein the predetermined format is one of PCL, .tif, .pdf and Postscript.

18. A method of transferring an output of a legacy application programmed to print to a pre-printed form to a plain paper printer, comprising:
    obtaining, by a computer, a data code file generated by the legacy application, said data code file representing the output of the legacy application in text and blank spaces, wherein the legacy application generates the data code file configured for printing directly onto a pre-printed paper form, the data code file comprising a predefined format associated with the legacy application;

identifying, by the computer, a selected one of a plurality of form code files associated with the data code file based on the output of the legacy application represented in the data code file, each one of the plurality of form code files specifying a corresponding one of plural types of forms, each of the types of forms comprising at least one of preprinted text, lines, boxes and logos;

merging, by the computer, the data code file generated by the legacy application with the form code file;

wherein each of said data code file and said form code file comprise instructions in a page description language, and wherein said merging is implemented by a printer backend program to create a merged file, and transferring the merged file to at least one of another computer, a web server and a database.

19. The method of claim 18, wherein the data code file includes an indicator associated with one of a predetermined set of the plurality of form code files.

20. The method of claim 18, wherein the data code file includes PCL containing instructions for printing the data on a pre-printed form.

21. The method of claim 18, further comprising:
converting the merged file to a predetermined format.

22. The method of claim 21, wherein the predetermined format is one of PCL, .tif, .pdf and Postscript.

23. The method of claim 18, further comprising:
printing the merged file using a plain paper printer.

24. A computer readable storage medium having computer readable program code embodied therein, the computer readable program code causing a computer to:

obtain a data code file generated by a legacy application, said data code file representing an output of the legacy application in text and blank spaces, wherein the legacy application is adapted to generate the data code file configured for printing directly onto a pre-printed paper form, the data code file comprising a predefined format associated with the legacy application;

identify a selected one of a plurality of form code files associated with the data code file based on the output of the legacy application represented in the data code file, each one of the plurality of form code files specifying a corresponding one of plural types of forms, each of the plural types of forms comprising at least one of preprinted text, lines, boxes and logos;

merge the data code file generated by the legacy application with the identified form code file to form a merged file; and send the merged file for printing using a plain paper printer, wherein each of said data code file and said identified form code file comprise instructions in a page description language, and wherein said merging is implemented by a printer backend program in the computer to create a merged file.

25. The computer readable storage medium of claim 24, wherein the computer readable program code further causes the computer to:

transfer the merged file to at least one of another computer, a web server and a database.

26. The computer readable storage medium of claim 24, wherein the computer readable program code further causes the computer to:

convert the merged file to a predetermined format.

27. The computer readable storage medium of claim 26, wherein the predetermined format is one of PCL, .tif, .pdf and Postscript.

28. The method of claim 1, wherein identifying the selected one of the plurality of form code files associated with the data code file is based on a layout of the output of the legacy application represented in the data code file.

29. The method of claim 7, wherein to identify the selected one of the plurality of form code files associated with the data code file is based on a layout of the output of the legacy application represented in the data code file.

30. The system of claim 12, wherein to identify the selected one of the plurality of form code files associated with the data code file is based on a layout of the output of the legacy application represented in the data code file.

31. The system of claim 18, wherein identifying the selected one of the plurality of form code files associated with the data code file is based on a layout of the output of the legacy application represented in the data code file.

32. The computer readable storage medium of claim 24, wherein to identify the selected one of the plurality of form code files associated with the data code file is based on a layout of the output of the legacy application represented in the data code file.

33. The method of claim 1, wherein merging the data code file generated by the legacy application with the identified form code file comprises merging the data code file generated by the legacy application without redaction of content of the data code file with the identified form code file to form the merged file.

34. The method of claim 7, wherein merging the data code file generated by the legacy application with the identified form code file comprises merging the data code file generated by the legacy application without redaction of content of the data code file with the identified form code file to form the merged file.

35. The system of claim 12, wherein merging the data code file generated by the legacy application with the identified form code file comprises merging the data code file generated by the legacy application without redaction of content of the data code file with the identified form code file to form the merged file.

36. The method of claim 18, wherein merging the data code file generated by the legacy application with the identified form code file comprises merging the data code file generated by the legacy application without redaction of content of the data code file with the identified form code file to form the merged file.

37. The computer readable storage medium of claim 24, wherein merging the data code file generated by the legacy application with the identified form code file comprises merging the data code file generated by the legacy application without redaction of content of the data code file with the identified form code file to form the merged file.

* * * * *

UNITED STATES PATENT AND TRADEMARK OFFICE
CERTIFICATE OF CORRECTION

| | | |
|---|---|---|
| PATENT NO. | : 7,821,666 B2 | Page 1 of 1 |
| APPLICATION NO. | : 10/326220 | |
| DATED | : October 26, 2010 | |
| INVENTOR(S) | : Floyd C. Double | |

It is certified that error appears in the above-identified patent and that said Letters Patent is hereby corrected as shown below:

In column 11, line 8, in Claim 1, delete "preprinted" and insert -- pre-printed --, therefor.

Signed and Sealed this
First Day of March, 2011

David J. Kappos
*Director of the United States Patent and Trademark Office*